Jan. 9, 1940.   E. HÜNNEBECK   2,186,297
SPACE ENCLOSING SUPPORTING STRUCTURE
Filed Feb. 10, 1938   3 Sheets-Sheet 1
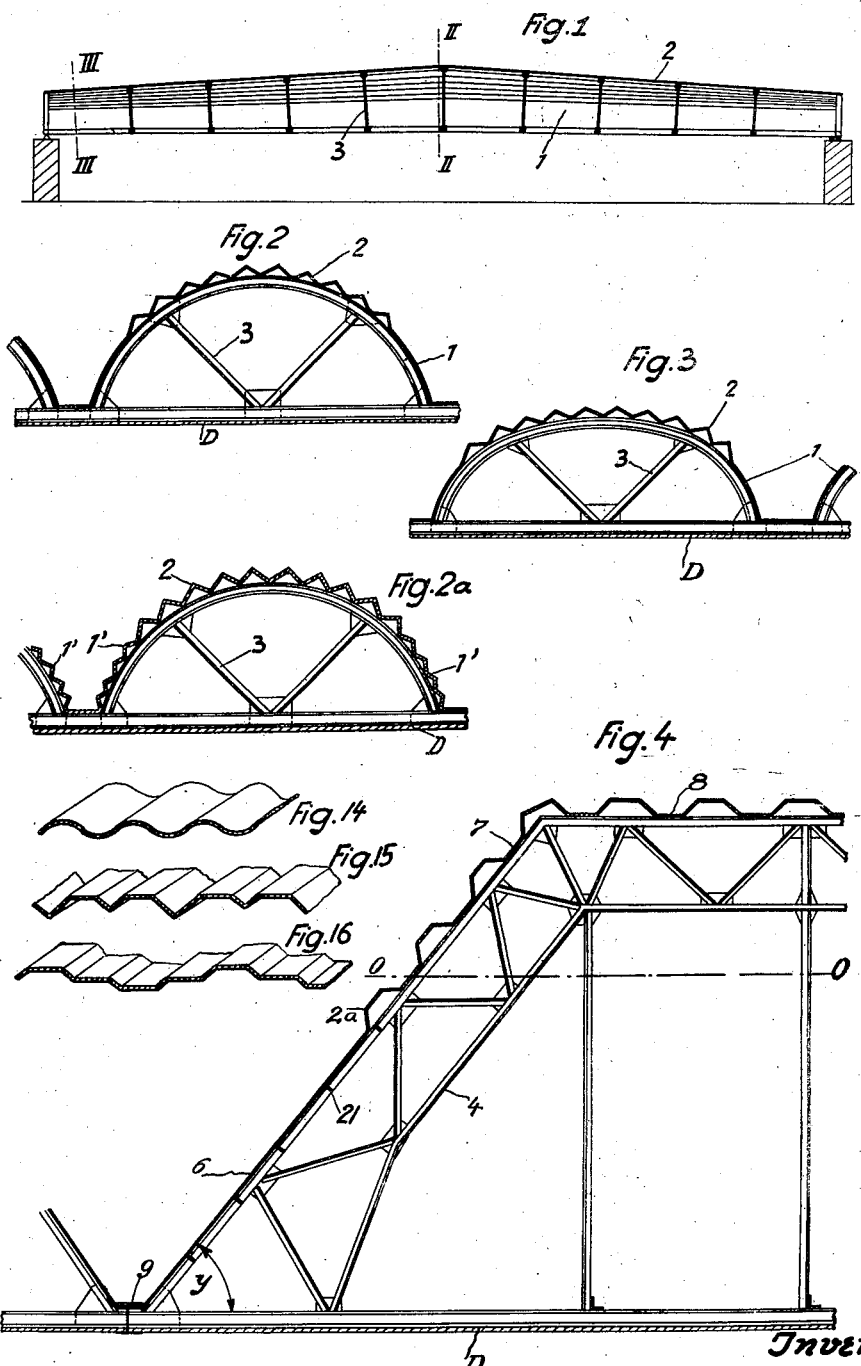
Inventor:
Emil Hünnebeck
By Williams, Bradbury,
McColet & Hinkle
Att'ys

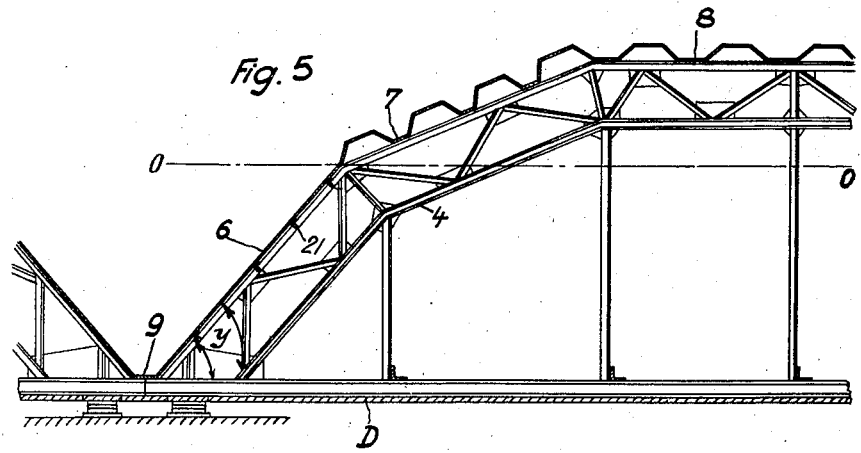
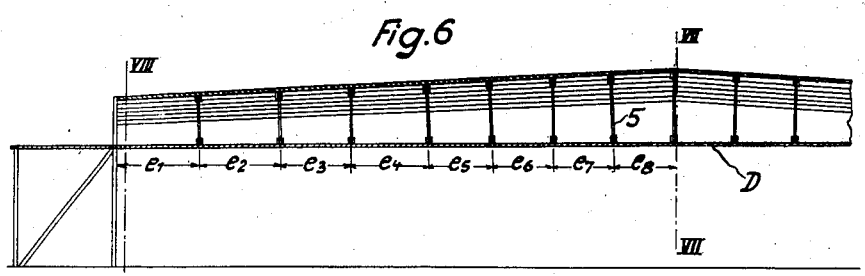
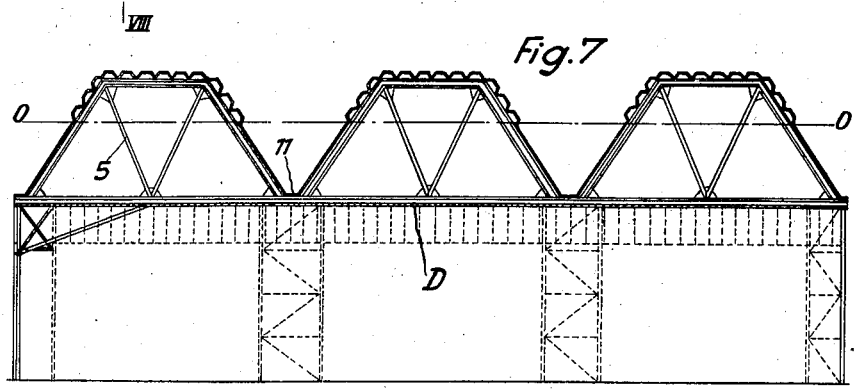

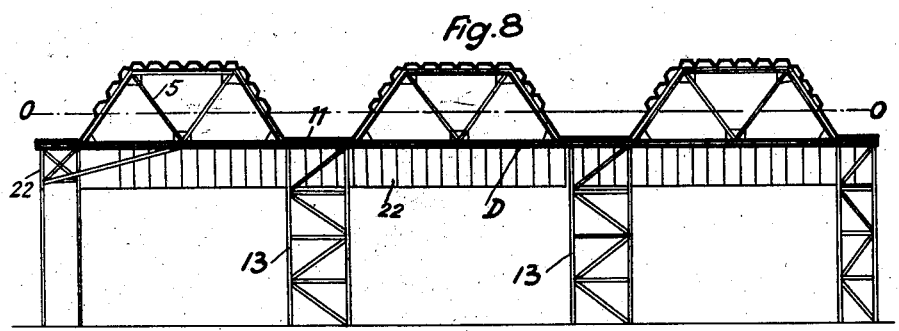
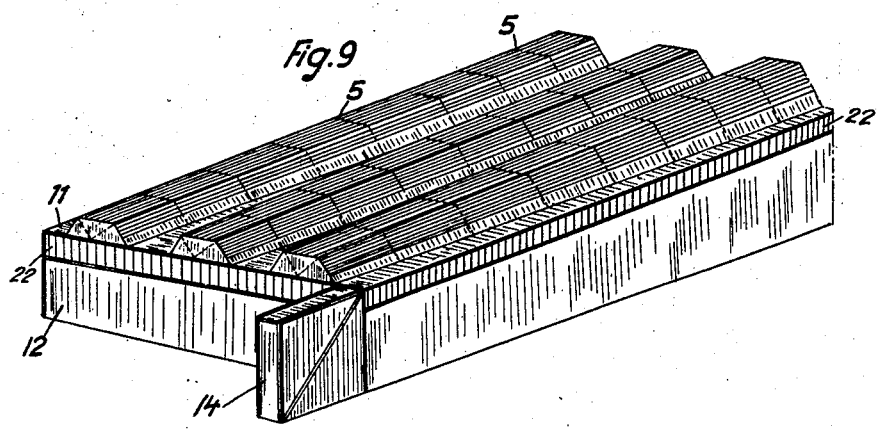
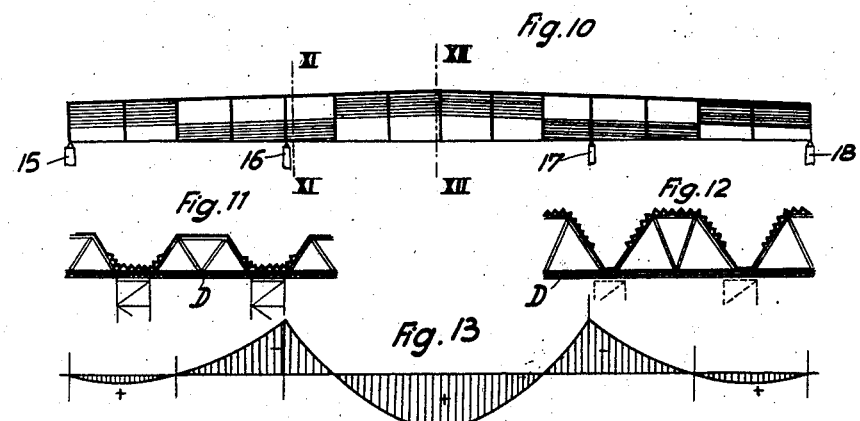
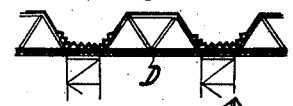
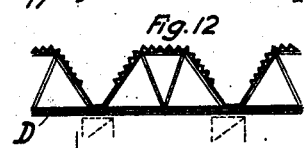

Patented Jan. 9, 1940

2,186,297

UNITED STATES PATENT OFFICE 2,186,297

SPACE ENCLOSING SUPPORTING STRUCTURE

Emil Hünnebeck, Dusseldorf, Germany

Application February 10, 1938, Serial No. 189,741
In Germany September 23, 1937

12 Claims. (Cl. 108—1)

This invention relates to a space-enclosing supporting structure for halls having a large span, which according to the plan ratio of the surfaces to be covered consists of one or more hollow bodies of sheet metal, which lie next to one another and act as beams.

Work in connection with the development of my prior patent application Serial No. 167,908, filed October 8, 1937 has led me to adopt a form of supporting structure, in which the hollow bodies represent arches which are arched transversely to the supporting direction and which are composed of corrugated or profiled self-supporting metal sheets, the corrugations or profiles of which extend parallel to the span. The corrugations or profiles provided in the sheets serve the purpose of ensuring the stability of the hollow body, more particularly however of providing security against local bulging and buckling. Closing supporting structures of this kind, which may be termed "doubly arched arches", provide a number of advantages, of which only the small constructional weight and the increased rigidity shall be mentioned.

Further investigations have shown, that the great bearing capacity of the "doubly arched arches" can be rarely utilised to its full extent and that the economy is fully effective only in the case of spans of 100 m. and more. The invention therefore has for its object to provide a space-enclosing supporting structure which has the same advantages for smaller spans as my copending application has for larger spans and in which the assembly of the parts is more simple.

The invention is based on the fundamental idea of construction disclosed in my copending application, namely to adopt as the cover for the hollow bodies metal sheets which are corrugated parallel to the main direction of support, but employing in place of the arches hollow bodies which act as beams.

An important feature of the invention consists in this, that the sheet metal cover for the individual hollow beam is corrugated or profiled, only in the region of the compressive stresses, for obtaining immunity from bulging and buckling, while in the region of the tensile stresses it consists of smooth metal sheets.

In supporting structures according to my invention the strength of the metal sheets enclosing the space are entirely utilised for supporting, and the cross-sections of the metal sheets may also be very thin. Such sheets, however, if they have, in accordance with the aforesaid feature of the invention, the form of flat sheets in the tension region of the hollow body, may become distorted under the action of the shearing stresses.

According to a further feature of the invention such distortion under the action of shearing stresses is avoided by the fact, that in the region of the tensile stresses the sheets are provided with corrugations, the height of which however is less than that of the corrugations of the sheets in the region of the compressive stresses.

Further features and advantages of the invention will be gathered from the following specification, in which several constructional examples are described with reference to the accompanying drawings, in which Fig. 1 is a diagrammatic side elevation of a supporting structure according to the invention, Fig. 2 shows a cross-section of the supporting structure taken on line II—II of Fig. 1, Fig. 2a shows a different constructional form of the invention similar to Fig. 2, Fig. 3 shows a cross section of the supporting structure taken on line I—I of Fig. 1, Figs. 4 and 5 show two cross-sections through another constructional form of the hollow bodies, again in the middle and in the vicinity of the bearing place, Fig. 6 shows a diagrammatic longitudinal section through another constructional form, Figs. 7 and 8 show two cross-sections on lines VII—VII and VIII—VIII of Fig. 6, Fig. 9 shows a perspective view of the hollow bodies lying next to one another, as applied to a hangar, Fig. 10 shows a representation of a supporting structure resting on four supports, Figs. 11 and 12 show cross-sections taken on lines XI—XI and XII—XII of Fig. 10, Fig. 13 shows the area of moments of the supporting structure shown in Fig. 10, Figs. 14, 15 and 16 show constructional forms of the corrugations which may be given to the sheet metal skin according to the invention.

Fig. 1 shows a supporting structure which consists of a plurality of hollow beams of substantially semicircular cross-section, which are disposed next to one another. In Figs. 2 and 3 a hollow beam is shown in two different cross-sections. The sheet metal skin 1 is smooth in the region of the tensile stresses, while in the region of the compressive stresses it has the profiled form 2. Instead of the kind of profile illustrated any other form of corrugation or rib may be used, which is sufficiently resistant to buckling and bulging.

In Figs. 14 to 16 I have shown several modifications of constructional forms of shapes which may be given to the sheet metal skin.

In the specification I have used the terms "corrugations" or "profiles"; these terms do not imply any limitation to any particular form of cross-section of the sheets. The reinforcements 3 which are disposed at certain distances from one another are provided for the sole purpose of insuring the hollow beam retaining its shape, not to act as a supporting structure, and may be constructed in the form of a frame plate or lattice work.

In order that the essence of the invention may be understood, it is necessary to state a few static principles: in the usual calculation of rolled or welded solid web girders, say of I-shaped cross-section, the cross-sections are so chosen that the tensile and compressive stresses become equal, so that the neutral axis lies substantially in the middle of the girder. This mode of calculation is readily understood, if it be borne in mind, that the metallic materials usually employed may be stressed equally in tension and compression.

My invention relates to a space-enclosing supporting structure, in which the sheet metal cover which acts as the closure is also to be utilised for the purpose of supporting, however the supporting sheet metal cover may be very thin, as the illustrated hollow body has a very great supporting capacity. With such thin cross-sections the above-mentioned assumption no longer applies, that is the tensile and compressive regions can be equally stressed; for the sheets in the region of the compressive stresses are subject to the danger of bulging and buckling outwards.

As is well known, the safety factor against bulging and buckling of metal sheets subjected to compressive stresses is equal to the intensity of the critical bulging and buckling stresses divided by the intensity of the compressive stresses prevailing in the cross-section. The safety of the sheets under tension of the other hand is equal to the ultimate tensile strength divided by the tensile stresses prevailing in the cross-section. Now, the ultimate tensile strength is considerably greater than the critical bulging and buckling strength and from this it will be clearly seen the advantage provided by using corrugated or profiled sheets lying in the compressive region so as to increase the bulging and buckling strength, and using smooth sheets in the tensile region.

As just explained, in the supporting structure according to the invention the sheets may be of very thin cross-section. The sheet metal cover of the hollow beams are subjected not only to compressive and tensile stresses, but to shear stresses as well. In the region of the tensile stresses the shear stresses may cause the sheets, if they are smooth, to become deformed.

According to a further feature of my invention corrugated metal sheets are provided in the region of the tensile stresses as well, the height of which are however, less than that of the corrugations in the region of the compressive stresses. This constructional example of the invention is illustrated in Fig. 2a. The invention is however in the first instance explained with reference to Fig. 2, in order to make it more readily understood, but the constructional example of Fig. 2 might be regarded as the extreme case of the invention illustrated in Fig. 2a.

On the above may further be based a consideration for the construction of the beam in the tensile region, which leads to two further important features of the invention:

As the safety factor in the tensile region depends solely on the ultimate tensile strength divided by the bending tensile stresses prevailing, the same security may be obtained, if both factors be increased, that is to say: on the one hand, for increasing the intensity of the stresses due to bending, the neutral axis is displaced in the direction towards the region of the compressive stressing, on the other hand a material of higher ultimate tensile strength is used. By displacement of the neutral axis in such a manner that greater tensile stresses and smaller compressive stresses occur, thus safety against bulging and buckling is increased in the compression region.

It may be stated, that the ultimate tensile strength of a material does not influence the critical resistance to bulging and buckling, so that it would not increase the resistance to bulging and buckling to make the sheets from steel of greater strength in the compressive region.

In beams according to my invention the sheets in the tension region consist for instance of a steel having a strength of 52 kg./mm$^2$. and the sheets in the compression region of a steel having a strength of 37 kg./mm$^2$.

In Figs. 4 and 5 the neutral axis is shown by the line O—O. The distance of the lowest fibre under tension from the neutral axis is considerably greater than the distance of the uppermost fibre under compression and the neutral axis thus lies unsymmetrically with respect to the cross-section of the beam. Now, since the position of the neutral axis may vary under the different stresses to which the structure is subjected, in the constructional form shown in Fig. 4, the last profile 2a of the sheet in the region under tension is positioned below the neutral axis.

In Figs. 4 and 5 there are also shown below the smooth sheets 6 in the region under tension small angle irons 21 which are welded to the sheets 6. These angle irons are provided for the purpose of reinforcing the sheets 6, so as to secure them against the effects of the shearing stresses. The angle irons 21, thus in the case of thin sheets 6, replace the slight corrugation 1' shown in Fig. 2a, which is provided for the same purpose.

In the beam according to the invention the reinforcements 3 serve only for retaining the form of the hollow body, but do not act as a supporting structure. The reinforcements 3 must not be confused with the usual trusses or the like.

In a beam resting on two supports the bending and compressive stresses are greater in the middle than nearer to the supports. If the above developed principle for obtaining a supporting structure of the lowest weight is to be made full use of, these variable stresses will have to be allowed for by correspondingly varying the shape of profile or the cross-section of the sheets along the length of the beam. Such variations are however very costly for constructional reasons. According to a further feature of my invention they are rendered superfluous by adapting the arrangement of the reinforcements to the course of the bending and compressive stresses.

Referring to Fig. 6 I have shown, that the distance e between the individual reinforcements 5 from the middle of the beam, that is in the region of the greatest bending and compressive stresses, towards the sides becomes gradually greater in accordance with the reduction in the bending and compressive stresses, that is to say $e_1$ is the greatest distance and $e_8$ the smallest distance.

Referring to Figure 1 I have shown that the height of the beam decreases in a known manner towards the supports. This reduction in height makes an adaptation to the course of the stresses possible and also ensures that rain water will run off. It presents however a number of special problems with regard to the designing of the beam, which are solved according to the invention in the following manner:

In the constructional form shown in Figs. 2, 2a and 3 the reduction in height is obtained in such a manner that the corrugated sheets 2 in the compression region, are bent differently, while the width and the development remain the same. In the cross-section shown in Fig. 3 the bending of the corrugated sheets is flatter than in Fig. 2. The sheets 1, 1' under tension which are smooth or have low corrugations, retain the same inclination and bending, but become gradually narrower.

In the constructional form shown in Figs. 4 and 5, which show two cross-sections through the same beam in the middle and at the support, the smooth sheets in the tension region retain their inclination y along the entire length of the beam, but become wider towards the middle. The corrugated sheets are not made arcuate as in Figs. 2 and 3, but trapeziform. The reinforcements 4 are constructed as lattice work and the reduction in height of the beam is obtained by the arrangement that the upper side 8 of the trapezium has the same width throughout the entire beam, while the sides 7 change their inclination. The bottoms 9 of the gutters are of the same width throughout the entire length of the beam.

In the constructional forms shown in Figs. 7 to 12 the reduction in height is obtained by the fact, that all the trapezium sides of the cross-section of the beam retain the same inclination, while the smooth sheets under tension gradually become narrower and the bottoms 11 of the gutters become correspondingly wider towards the supports. In this case the reinforcements 5 are welded frames.

The perspective view shown in Fig. 9 shows the decrease in the trapezium-shaped cross-sections and the reduction in the distance between the reinforcements 5. The wall 12 of masonry covers the lattice work supports 13 shown in Fig. 8. The casing 14 forms a chamber for the reception of the sliding doors. At 22 the windows are indicated, which may be arranged both in the supporting walls and be suspended from the roof D.

Figs. 10 to 13 show a constructional form of the invention, in which the beam rests on four supports 15 to 18. The curves of the moments are shown graphically for this case in Fig. 13. The tensile stresses here alternate with the compressive stresses along the length of the beam and, in view of what has been said above, it will be obvious that according to the invention the smooth sheets must be arranged in the region of the negative moments in the upper part of the beam and in the region of the positive moments in the lower part of the beam.

In the constructional examples shown in Figs. 4 to 12 the sheets in the region of the tensile stresses are, for the sake of simplifying the illustration, shown as smooth sheets. In accordance with what was said in connection with Figs. 1 to 3, it will be readily understood that in place of the smooth sheets corrugated sheets may also be employed and that, as long as the height of these corrugations is less than that of the corrugations in the compression region, the invention is realised.

The various reinforcements shown in all the constructional forms serve for the suspension of a ceiling covering the interior, which in all the figures bears the reference D. This ceiling consists of a material which is fire-resisting and insulates against cold and heat, so that the supporting parts of the roof are protected against the effects of a fire within the building. Furthermore, the ceiling keeps the moist inner air from the sheet metal parts, rusting of the sheet metal cover due to the formation of water of condensation is prevented.

If the supporting structure according to one of the constructional forms so far described be used for instance for a hangar of 70.00 or 85.00 m. span, the smooth and inclined sheets will have a thickness of from 4 to 5 mm. As experiments carried out by the inventor have proved, however, this thickness of sheet will prevent the penetration of incendiary bombs, so that the sheet metal skin not only fulfills the duty of enclosing space and of supporting, but in addition serves as an impenetrable armour. By using high quality steel in the tension region, safety against penetration is still further increased.

A further advantage of the supporting structure according to the invention consists in this, that in the case of catastrophes there are no longer any endangered constructional elements. If for instance in place of the beam an arch were used, it would then be necessary to provide either tie members or heavy abutments. With the supporting structure the tie members are converted, in the tension region of the smooth sheets, into a space closure and by the elimination of these tie members or the abutments a saving in steel of about 25% is obtained. By using beams in place of arches the enclosed spaces become lower, as the rise of the arch is eliminated, so that in view of the provision at the under side of the fire-resisting and insulating ceiling D the space to be heated corresponds to the enclosed space, as is shown for instance in Figs. 6, 7, 8 and 9. Due to the low height of structures according to the invention, no difficulties are offered to maneuvering air crafts approaching the hangar.

A further simplification as regards erection is provided by the fact, that it is possible to mount the supporting structure on the ground without the employment of scaffolding. The assembly is carried out by first erecting the reinforcements or "transverse bulk heads" and then covering them with the sheets, so that the transverse bulk heads themselves fulfill the function of scaffolding. The beams constituted by hollow bodies, which lie next to one another, are then lifted individually at the points of support and are placed on the supporting places. It is even possible, by employing hydraulic jacks, to lift the supporting structure as a whole, even in the case of considerable ground areas of about 4000 sq. m., in a single operation and to deposit them on the supports.

What I claim is:

1. A space-enclosing supporting structure for halls, comprising a plurality of beam-like hollow elements composed of metal sheets, which lie next to one another, the metal sheets of each individual hollow element being corrugated in a transverse plane of said hollow element at least in the region of the compressive stresses, so as to increase the resistance to bulging and buckling.

2. A space-enclosing supporting structure for halls, comprising a plurality of beam-like hollow elements composed of metal sheets, which lie next to one another, the metal sheets of each individual hollow element being corrugated in a transverse plane of said hollow element in the region of the compressive stresses, so as to increase the resistance to bulging and buckling, and being smooth in the region of the tensile stresses.

3. A space-enclosing supporting structure for halls, comprising a plurality of beam-like hollow elements composed of metal sheets, which lie next to one another, the metal sheets of each individual hollow element being provided with corrugations in a transverse plane of said hollow element, the height of which are greater in the region of the compressive stresses than in the region of the tensile stresses.

4. A space-enclosing supporting structure for halls, comprising a plurality of beam-like hollow elements composed of metal sheets, which lie next to one another, the metal sheets of each individual hollow element being corrugated in a transverse plane of said hollow element at least in the region of the compressive stresses, so as to increase the resistance to bulging and buckling, the metal sheets in the tension region being made of a material of greater strength than the metal sheets in the compressive region.

5. A space-enclosing supporting structure for halls, comprising a plurality of beam-like hollow elements composed of metal sheets, which lie next to one another, the metal sheets of each individual hollow element being corrugated in a transverse plane of said hollow element at least in the region of the compressive stresses, so as to increase the resistance to bulging and buckling, and the form of the cross-section of the beam-like hollow elements being such that the neutral axis lies unsymmetrically to said elements.

6. A space-enclosing supporting structure for halls, comprising a plurality of beam-like hollow elements composed of metal sheets, which lie next to one another, the metal sheets of each individual hollow element being corrugated in a transverse plane of said hollow element at least in the region of the compressive stresses, so as to increase the resistance to bulging and buckling, and the beams becoming lower in the longitudinal direction towards their ends and being adapted to the slope of the roof and to the curve of the moments.

7. A space-enclosing supporting structure for halls, comprising a plurality of beam-like hollow elements composed of metal sheets, which lie next to one another, the metal sheets of each individual hollow element being corrugated in a transverse plane of said hollow element at least in the region of the compressive stresses, so as to increase the resistance to bulging and buckling, and the cross-section of the hollow element being made such that great tensile stresses in bending and small compressive stresses in bending result.

8. A space-enclosing supporting structure for halls, comprising a plurality of beam-like hollow elements composed of metal sheets, which lie next to one another, the metal sheets of each individual hollow element being corrugated in a transverse plane of said hollow element at least in the region of the compressive stresses, so as to increase the resistance to bulging and buckling, and comprising reinforcements provided in the elements at right angles to the main supporting direction and spaced from one another.

9. A space-enclosing supporting structure for halls, comprising a plurality of beam-like hollow elements composed of metal sheets, which lie next to one another, the metal sheets of each individual hollow element being corrugated in a transverse plane of said hollow element at least in the region of the compressive stresses, so as to increase the resistance to bulging and buckling, and comprising reinforcements provided in the elements at right angles to the main supporting direction and spaced from one another, said reinforcements connecting the individual elements with one another.

10. A space-enclosing supporting structure for halls, comprising a plurality of beam-like hollow elements composed of metal sheets, which lie next to one another, the metal sheets of each individual hollow element being corrugated in a transverse plane of said hollow element at least in the region of the compressive stresses, so as to increase the resistance to bulging and buckling, and comprising reinforcements provided in the elements at right angles to the main supporting direction and spaced from one another, so that the distance between the individual reinforcements is adapted to the sequence of bending and compressive stresses.

11. A space-enclosing supporting structure for halls, comprising a plurality of beam-like hollow elements composed of metal sheets, which lie next to one another, the metal sheets of each individual hollow element being corrugated in a transverse plane of said hollow element at least in the region of the compressive stresses, so as to increase the resistance to bulging and buckling, and comprising reinforcements provided in the elements at right angles to the main supporting direction and spaced from one another, and a heat-insulating ceiling suspended from the reinforcements.

12. A space-enclosing supporting structure for halls, comprising a plurality of beam-like hollow elements composed of metal sheets, which lie next to one another, the metal sheets of each individual hollow element being corrugated in a transverse plane of said hollow element at least in the region of the compressive stresses, so as to increase the resistance to bulging and buckling, and comprising reinforcements provided in the elements at right angles to the main supporting direction and spaced from one another, and a fire-resisting ceiling suspended from the reinforcements.

EMIL HÜNNEBECK.